United States Patent
Kerstetter, III et al.

(10) Patent No.: US 10,266,683 B2
(45) Date of Patent: Apr. 23, 2019

(54) COMPOSITIONS AND METHODS FOR MAKING THEM

(71) Applicant: ExxonMobil Chemical Patents Inc., Baytown, TX (US)

(72) Inventors: Randal H. Kerstetter, III, Wadsworth, OH (US); Eric P. Jourdain, Rhode Saint Genese (BE); Toshiaki Yamaguchi, Kanagawa Prefecture (JP); Eugene R. Uhl, Massillon, OH (US); Hiroshi Kawasaki, Tokyo (JP)

(73) Assignee: ExxonMobil Chemical Patents Inc., Baytown, TX (US)

(*) Notice: Subject to any disclaimer, the term of this patent is extended or adjusted under 35 U.S.C. 154(b) by 81 days.

(21) Appl. No.: 14/386,688

(22) PCT Filed: Apr. 24, 2013

(86) PCT No.: PCT/US2013/037991
§ 371 (c)(1),
(2) Date: Sep. 19, 2014

(87) PCT Pub. No.: WO2013/169485
PCT Pub. Date: Nov. 14, 2013

(65) Prior Publication Data
US 2015/0056457 A1 Feb. 26, 2015

Related U.S. Application Data

(60) Provisional application No. 61/654,471, filed on May 10, 2012.

(51) Int. Cl.
| | |
|---|---|
| *C08L 23/02* | (2006.01) |
| *C08L 21/00* | (2006.01) |
| *B32B 25/08* | (2006.01) |
| *B32B 27/28* | (2006.01) |
| *C08L 23/10* | (2006.01) |
| *C08L 23/04* | (2006.01) |

(52) U.S. Cl.
CPC ............. *C08L 23/02* (2013.01); *B32B 25/08* (2013.01); *B32B 27/283* (2013.01); *C08L 21/00* (2013.01); *B32B 2250/02* (2013.01); *B32B 2250/24* (2013.01); *B32B 2274/00* (2013.01); *B32B 2307/712* (2013.01); *B32B 2307/746* (2013.01); *B32B 2581/00* (2013.01); *C08L 23/04* (2013.01); *C08L 23/10* (2013.01); *C08L 2205/025* (2013.01); *C08L 2205/035* (2013.01); *C08L 2207/062* (2013.01); *C08L 2207/324* (2013.01); *Y10T 428/31663* (2015.04)

(58) Field of Classification Search
CPC .......... C08L 23/02; C08L 23/04; C08L 23/10; C08L 2205/025; C08L 2205/035; C08L 2207/062; C08L 2207/324; C08L 21/00; B32B 27/283; B32B 25/08; B32B 2307/746; B32B 2307/712; B32B 2274/00; B32B 2581/00; B32B 2250/02; B32B 2250/24; Y10T 428/31663

See application file for complete search history.

(56) References Cited

U.S. PATENT DOCUMENTS

| | | | |
|---|---|---|---|
| 5,447,671 A | 9/1995 | Kato et al. | |
| 5,656,680 A * | 8/1997 | Aguirre | B60C 1/0016 508/202 |
| 6,146,739 A | 11/2000 | Itoh et al. | |
| 8,354,468 B2 | 1/2013 | Toyoda et al. | |
| 2002/0055567 A1* | 5/2002 | Romenesko | C08L 23/02 524/261 |
| 2005/0038186 A1 | 2/2005 | Morikawa et al. | |
| 2006/0057412 A1 | 3/2006 | Jacob et al. | |
| 2007/0122570 A1 | 5/2007 | Honda et al. | |
| 2008/0021159 A1* | 1/2008 | Abraham | C08F 255/00 525/88 |
| 2008/0081869 A1* | 4/2008 | Kerstetter | C08L 21/00 524/502 |
| 2012/0059105 A1* | 3/2012 | Kerstetter, III | C08L 23/10 524/412 |

FOREIGN PATENT DOCUMENTS

| | | |
|---|---|---|
| CN | 1693352 | 11/2005 |
| EP | 0 860 314 | 8/1998 |
| EP | 1 441 005 | 7/2004 |
| EP | 2980150 A1 | 2/2016 |
| JP | 07-281450 | 10/1995 |
| JP | 1998-330540 | 12/1998 |
| JP | 2002-201320 | 7/2002 |
| JP | 2011-052031 | 3/2011 |
| WO | WO 01/18108 | 3/2001 |
| WO | WO 2009/064299 | 5/2009 |

OTHER PUBLICATIONS

Dow Corning Xiametere® PMX-200 Silicone Fluid Product Data Sheet, 2010, p. 1-3.*
Multibase Siloxane Masterbatch Range Product Data Sheet, 2010, p. 1-3.*
Drobny, J.G.; Handbook of Thermoplastic Elastomers, 2007, p. 19-20.*

* cited by examiner

*Primary Examiner* — Robert S Jones

(57) ABSTRACT

Provided are compositions comprising: (i) a dispersed phase of rubber that is at least partially cured; (ii) a continuous thermoplastic phase including at least one thermoplastic polymer; (iii) a first polysiloxane having a number average molecular weight greater than 100 kg/mole; and (iv) a second polysiloxane having a number average molecular weight less than 100 kg/mole, and methods for making such compositions. Also provided are laminates including such compositions, weatherseals made therefrom, and methods for making them.

14 Claims, No Drawings

COMPOSITIONS AND METHODS FOR MAKING THEM

PRIORITY CLAIM

This application is a 371 National Stage Application of International Application No. PCT/US2013/037991, filed Apr. 24, 2013, which claims priority to and the benefit of U.S. Ser. No. 61/645,471, filed on May 10, 2012, the disclosures of each which are incorporated herein by reference in their entirety.

FIELD OF THE INVENTION

This invention relates to compositions comprising a first polysiloxane and a second polysiloxane. The compositions may be useful as slip-coat compositions, laminates, or weatherseals.

BACKGROUND OF THE INVENTION

Window channels are commonly employed to mate glass to a window frame.

These window channels typically comprise soft, resilient materials that provide structural integrity and often advantageously provide an environmental or acoustical seal. As a result, many window channels are referred to as weatherseals. In certain uses, such as in automobiles and the like, the weatherseal also provides a surface against which a retractable window can slide and seal. In addition to providing an adequate seal, it is desirable that the weatherseal is abrasion resistant and demonstrates a low coefficient of friction.

In one instance, window channels may be enhanced with a slip coat that may include a polymeric film or layer that is applied over a substrate layer, which is typically a rubbery material. For example, U.S. Pat. No. 5,447,671 describes a weatherseal that includes a contacting layer applied to a substrate. The substrate comprises a resilient and flexible synthetic resin or synthetic rubber, and the contacting layer may include a blend of high molecular weight polyethylene (300,000 g/mol) and ultra-high molecular weight polyethylene (1,300,000 g/mol).

U.S. Pat. No. 6,146,739 describes a glass-run channel that includes a contact part that includes a substrate layer and a slide-resin layer. The substrate layer includes a thermoplastic elastomer (e.g., a blend of a rubber and thermoplastic resin), and the slide-resin layer includes an ultra-high molecular weight polyolefin having an intrinsic viscosity of 7 to 40 dl/g as measured in a solvent at 135° C. decalin, a polyolefin having an intrinsic viscosity of 0.1 to 5 dl/g as measured in a solvent at 135° C. decalin, and a thermoplastic elastomer that includes a rubber and a thermoplastic resin.

JP Kokai 7-346094 describes slip-coat compositions that contain fully or partially-crosslinked olefin-based thermoplastic elastomer, a thermoplastic polyolefin resin, a plasticizer, and a filler, with a fatty amide, and either a polyolefin resin or an organopolysiloxane or both a polyolefin resin and an organopolysiloxane, and optionally silica. Exemplified are organopolysiloxanes characterized as ultra-high molecular weight silicon oil sold under the tradename BY16-140 (Dow Corning Toray Silicone Co. Ltd.) or silicone having 1,000,000 cSt viscosity sold under the tradename SH200 (Dow Corning Toray Silicon Co. Ltd.).

There remains a need to improve weatherseals and particularly the slip coatings of the weatherseals. In particular, there remains a need to improve the coefficient of friction of these slip coatings as well as the surface characteristics of these coatings, such as their appearance.

SUMMARY OF THE INVENTION

Provided herein are compositions comprising: (i) a dispersed phase of rubber that is at least partially cured; (ii) a continuous thermoplastic phase including at least one thermoplastic polymer; (iii) a first polysiloxane having a number average molecular weight greater than 100 kg/mole; and (iv) a second polysiloxane having a number average molecular weight less than 100 kg/mole.

Also provided herein are laminates comprising: (a) a first layer including: (i) a dispersed phase of rubber that is at least partially cured, (ii) a continuous thermoplastic phase, (iii) a first polysiloxane having a number average molecular weight greater than 100 kg/mole, and (iv) a second polysiloxane having a number average molecular weight less than 100 kg/mole; and (b) a second layer, including a polymer. Also provided are methods for making the compositions and laminates described herein.

DETAILED DESCRIPTION OF ILLUSTRATIVE EMBODIMENTS

Provided herein are compositions that include an at least partially-cured rubber dispersed within a continuous thermoplastic phase and a first and second polysiloxane, as well as other optional ingredients such as slip aids. The first polysiloxane can be characterized by a molecular weight greater than 100 kg/mole, and the second polysiloxane can be characterized by a molecular weight less than 100 kg/mole. The compositions of the present invention may be useful as slip-coat compositions, and show technologically useful sliding force over long numbers of cycles in wet conditions and over a broad temperature span. Moreover, advantageous results may be achieved when the composition is formulated to meet certain hardness thresholds and applied over certain thermoplastic vulcanizate substrates. Thus, embodiments of the invention are also directed toward laminates that include the composition of the present invention deposited on a substrate.

The compositions of the present invention, which may be useful as slip-coat compositions, include a cured rubber dispersed within a continuous thermoplastic phase, a first polysiloxane having a number average molecular weight greater than 100 kg/mole, and a second polysiloxane having a number average molecular weight less than 100 kg/mole. In one or more embodiments, the compositions further include a slip aid, a filler, and/or a hydrocarbon oil. In one or more embodiments, the thermoplastic phase includes a blend polypropylene and polyethylene.

Rubber

The rubbers that may be employed to form the rubber phase include those polymers that are capable of being cured or crosslinked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

The term ethylene-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

The ethylene-propylene rubber may include from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer may include from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-ethylidene-2-norbornene. In one or more embodiments, where the diene includes 5-vinyl-2-norbornene, the ethylene-propylene rubber may include at least 1% by weight, or at least 3% by weight, or at least 4% by weight, or at least 5% by weight, or from about 1 to about 15% by weight, or from about 5% to about 12% by weight, or from about 7% to about 11% by weight units deriving from 5-vinyl-2-norbornene.

The ethylene-propylene rubber may have a weight average molecular weight ($M_w$) that is greater than 100,000 g/mole, or greater than 200,000 g/mole, or greater than 400,000 g/mole, or greater than 600,000 g/mole. Preferably, the $M_w$ of the ethylene-propylene rubber is less than 1,200,000 g/mole, or less than 1,000,000 g/mole, or less than 900,000 g/mole, or less than 800,000 g/mole.

Useful ethylene-propylene rubbers may have a number average molecular weight ($M_n$) that is greater than 20,000 g/mole, or greater than 60,000 g/mole, or greater than 100,000 g/mole, or greater than 150,000 g/mole. The $M_n$ of the ethylene-propylene rubbers may be less than 500,000 g/mole, or less than 400,000 g/mole, or less than 300,000 g/mole, or less than 250,000 g/mole.

Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules,* 1988, volume 21, page 3360, by Verstrate et al., which is also herein incorporated by reference, and references cited therein.

The ethylene-propylene rubber may also be characterized by having a Mooney viscosity ($ML_{(1+4)}$ at 125° C.) per ASTM D-1646, of from about 10 to about 500, or from about 50 to about 450. As used herein, Mooney viscosity is reported using the format: Rotor ([pre-heat time, min.]+[shearing time, min.] @ measurement temperature, ° C.), such that ML (1+4 @125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML(1+4 @125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 ML points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4 @125° C.) value equivalent. The MST rotor used herein was prepared and utilized according to the following specifications:

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \quad (1)$$

wherein all logarithms are to the base 10; ML is the Mooney viscosity of a blend of two polymers A and B each having individual Mooney viscosities $ML_A$ and $ML_B$, respectively; $n_A$ represents the wt % fraction of polymer A in the blend; and $n_B$ represents the wt % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4@125° C.) conditions. Knowing ML, $ML_A$ and $n_A$, the value of $ML_B$ can be calculated.

However, for high Mooney viscosity polymers (i.e., Mooney viscosity greater than 100 ML(1+4@125° C.)), $ML_A$ is measured using the MST rotor as described above. The Mooney viscosity of the low molecular weight polymer in the blend is then determined using Equation 1 above, wherein $ML_A$ is determined using the following correlation (2):

$$ML_A(1+4@125°\ C.)=5.13*MST_A(5+4@200°\ C.) \qquad (2)$$

The ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

The ethylene-propylene rubber may be characterized by a glass transition temperature ($T_g$), as determined by Differential Scanning calorimetry (DSC) according to ASTM E-1356, that is less than −20° C., in other embodiments less than −30° C., in other embodiments less than −50° C., and in other embodiments from about −20 to about −60° C.

Ethylene-propylene rubbers may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (Lanxess), Nordel™ IP (Dow), NORDEL MG™ (Dow), Royalene™ (Lion Copolymer) and Buna™ (Lanxess).

The rubber is cured by employing dynamic vulcanization techniques. Dynamic vulcanization refers to a vulcanization or curing process for a rubber contained in a blend that includes the rubber and at least one thermoplastic resin. The rubber is vulcanized under conditions of shear and extension at a temperature at or above the melting point of the thermoplastic resin. The rubber is preferably simultaneously crosslinked and dispersed (preferably as fine particles) within the thermoplastic resin matrix, although other morphologies, such as co-continuous morphologies, may exist depending on the degree of cure, the rubber to plastic viscosity ratio, the intensity of mixing, the residence time, and the temperature.

After dynamic vulcanization, the rubber is in the form of finely-divided and well-dispersed particles of vulcanized or cured rubber within a continuous thermoplastic phase or matrix, although a co-continuous morphology is also possible. In those embodiments where the cured rubber is in the form of finely-divided and well-dispersed particles within the thermoplastic medium, the rubber particles typically have an average diameter that is less than 50 μm, or less than 30 μm, or less than 10 μm, or less than 5 μm, or less than 1 μm. In preferred embodiments, at least 50%, or at least 60%, or at least 75% of the rubber particles have an average diameter of less than 5 μm, or less than 2 μm, or less than 1 μm.

The rubber within the composition is preferably at least partially cured. In one or more embodiments, the rubber is advantageously completely or fully cured. The degree of cure can be measured by determining the amount of rubber that is extractable from the thermoplastic vulcanizate by using cyclohexane or boiling xylene as an extractant. Preferably, the rubber has a degree of cure where not more than 15 weight percent, or not more than 10 weight percent, or not more than 5 weight percent, or not more than 3 weight percent is extractable by cyclohexane at 23° C. as described in U.S. Pat. Nos. 4,311,628, 5,100,947 and 5,157,081, which are incorporated herein by reference. Alternatively, the rubber has a degree of cure such that the crosslink density is at least $4\times10^{-5}$, or at least $7\times10^{-5}$, or at least $10\times10^{-5}$ moles per milliliter of rubber. See Crosslink Densities and Phase Morphologies in Dynamically Vulcanized TPEs, by Ellul et al., Rubber Chemistry and Technology, Vol. 68, pp. 573-584 (1995).

The rubber may be dynamically vulcanized by employing various cure systems, which are known in the art. For example, phenolic resin, hydrosilation (a.k.a. silicon-containing cure systems), and free radical cure systems may be employed.

Useful phenolic cure systems are disclosed in U.S. Pat. Nos. 2,972,600, 3,287,440, 5,952,425 and 6,437,030, which are incorporated herein by reference. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one or more embodiments, a blend of octylphenol-formaldehyde and nonylphenol-formaldehyde resins is employed. The blend may include from about 25 to about 40 wt % octylphenol-formaldehyde and from about 75 to about 60 wt % nonylphenol-formaldehyde, in other embodiments, the blend includes from about 30 to about 35 wt % octylphenol-formaldehyde and from about 70 to about 65 wt % nonylphenol-formaldehyde. In one or more embodiments, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

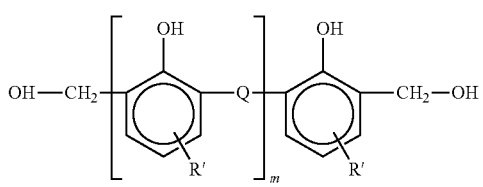

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

The phenolic resin may be employed in an amount from about 2 to about 6 parts by weight, or from about 3 to about 5 parts by weight, or from about 4 to about 5 parts by weight per 100 parts by weight of rubber.

A complementary amount of stannous chloride may include from about 0.5 to about 2.0 parts by weight, or from about 1.0 to about 1.5 parts by weight, or from about 1.2 to about 1.3 parts by weight per 100 parts by weight of rubber. In conjunction therewith, from about 0.1 to about 6.0 parts by weight, or from about 1.0 to about 5.0 parts by weight, or from about 2.0 to about 4.0 parts by weight of zinc oxide may be employed. In one or more embodiments, the olefinic rubber employed with the phenolic curatives includes diene units deriving from 5-ethylidene-2-norbornene.

Silicon-containing cure systems may include silicon hydride compounds having at least two SiH groups. Useful silicon hydride compounds include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

The silane-containing compounds may be employed in an amount from about 0.5 to about 5.0 parts by weight, or from about 1.0 to about 4.0 parts by weight, or from about 2.0 to about 3.0 parts by weight per 100 parts by weight of rubber. A complementary amount of catalyst may include from about 0.5 to about 20.0 parts, or from about 1.0 to about 5.0 parts, or from about 1.0 to about 2.0 parts of metal per million parts by weight of the rubber. In one or more embodiments, the olefinic rubber employed with the hydrosilylation curatives includes diene units deriving from 5-vinyl-2-norbornene.

The cure system employed in practicing this invention includes a free-radical cure agent and a coagent. Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di (tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

Useful peroxides and their methods of use in dynamic vulcanization of thermoplastic vulcanizates are disclosed in U.S. Pat. No. 5,656,693, which is incorporated herein by reference for purpose of U.S. patent practice.

The coagent may include a multi-functional acrylate ester, a multi-functional methacrylate ester, or combination thereof. In other words, the coagents include two or more organic acrylate or methacrylate substituents. Examples of multi-functional acrylates include diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof. Examples of multi-functional methacrylates include trimethylol propane trimethacrylate (TMPTMA), ethylene glycol dimethacrylate, butanediol dimethacrylate, butylene glycol dimethacrylate, diethylene glycol dimethacrylate, polyethylene glycol dimethacrylate, allyl methacrylate, or combinations thereof.

Thermoplastic Resin

The thermoplastic resin phase includes those thermoplastic polymers that include solid, generally high molecular weight plastic resins. Exemplary thermoplastic polymers include crystalline, semi-crystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, as in U.S. Pat. No. 6,867,260 B2, which is incorporated by reference herein. Copolymers available under the tradename VISTAMAXX™ (ExxonMobil) are specifically included.

Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic resin may include propylene-based polymers including those solid, generally high-molecular weight plastic resins that primarily comprise units deriving from the polymerization of propylene. In certain embodiments, at least 75%, or at least 90%, or at least 95%, or at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

The propylene-based polymers may include semi-crystalline polymers. These polymers may be characterized by a crystallinity of at least 25% by weight, or at least 55% by weight, or at least 65%, or at least 70% by weight. Crystallinity may be determined by dividing the heat of fusion of a sample by the heat of fusion of a 100% crystalline polymer, which is assumed to be 290 joules/gram for polypropylene.

In one or more embodiments, the propylene-based polymers may be characterized by an $H_f$ of at least 52.3 J/g, or in excess of 100 J/g, or in excess of 125 J/g, or in excess of 140 J/g.

In one or more embodiments, useful propylene-based polymers may be characterized by an $M_w$ of from about 50 to about 2,000 kg/mole, or from about 100 to about 600 kg/mole. They may also be characterized by a $M_n$ of about 25 to about 1,000 kg/mole, or about 50 to about 300 kg/mole, as measured by GPC with polystyrene standards.

In one or more embodiments, useful propylene-based polymers can have a MFR (ASTM D-1238, 2.16 kg @ 230° C.) of less than 100 dg/min, or less than 50 dg/min, or less than 10 dg/min, or less than 5 dg/min. In these or other embodiments, the propylene-based polymers can have a MFR of at least 0.1 dg/min, or 0.2 dg/min, or at least 0.5 dg/min.

In one or more embodiments, useful propylene-based polymers can have a melt temperature ($T_m$) that is from about 110° C. to about 170° C., or from about 140° C. to about 168° C., or from about 160° C. to about 165° C. They may have a glass transition temperature ($T_g$) of from about −10° C. to about 10° C., or from about −3° C. to about 5° C., or from about 0° C. to about 2° C. In one or more embodiments, they may have a crystallization temperature ($T_c$) of at least about 75° C., or at least about 95° C., or at least about 100° C., or at least 105° C., or ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultra-high molecular weight polypropylene that has a fractional melt flow rate can be employed. In one or more embodiments, polypropylene resins may be characterized by a MFR (ASTM D-1238; 2.16 kg @ 230° C.) that is less than or equal to 10 dg/min, or less than or equal to 1.0 dg/min, or less than or equal to 0.5 dg/min.

In one or more embodiments, the thermoplastic phase includes, in addition to a polypropylene resin, a polyethylene resin. In one or more embodiments, this polyethylene resin includes at least 90%, or at least 95%, or at least 99% of the polymeric units derive from ethylene. In one or more embodiments, this polyethylene resin is a polyethylene homopolymer.

In one or more embodiments, the polyethylene used in conjunction with the polypropylene may be characterized by having a weight average molecular weight of from about 100 to 250 kg/mole, or from about 110 to 220 kg/mole, or from about 150 to 200 kg/mole. This polyethylene may be characterized by having a polydispersity that is less than 12, or less than 11, or less than 10, or less than 9.

In one or more embodiments, the polyethylene used in conjunction with the polypropylene may be characterized by having a melt index from 1.2 to 12 dg/min, or from 0.4 to 10 dg/min, or from 0.5 to 8.0 dg/min, per ASTM D-1238 at 190° C. and 2.16 kg load.

In one or more embodiments, the polyethylene used in conjunction with the polypropylene may be characterized by an intrinsic viscosity as determined per ASTM D 1601 and D 4020 that is from 0.5 to 10 dl/g, or from 1.0 to 9.0 dl/g, or from 1.5 to 8.0 dl/g.

In one or more embodiments, the polyethylene used in conjunction with the polypropylene resin may be characterized by a density as measured per ASTM D4883 that is greater than 0.93 g/cc, or greater than 0.94 g/cc, or greater than 0.95 g/cc.

Polymers useful as the polyethylene used in conjunction with the polypropylene may be generally referred to as high density polyethylene resins. For example, useful high density polyethylene resins include those available under the tradename HDPE HD7960.13 (ExxonMobil).

Polysiloxanes

In general, polysiloxanes include those organosilicon polymers and oligomers including mer units having the formula —$R_2SiO$—, where each R is independently an organic group such as a hydrocarbyl group. Exemplary types of hydrocarbyl groups include alkyl, alkenyl, aryl. These polysiloxane compounds may also be referred to as silicones. Exemplary types of polysiloxanes include poly(hydro)(alkyl)siloxanes, polydialkylsiloxanes, polydiarylsiloxanes, and poly(hydro)(aryl)siloxanes, poly(alkyl)(aryl)siloxanes. Specific examples of polysiloxanes include polydimethylsiloxane, polydiethylsiloxane, polymethylethylsiloxane, polydipropylsiloxane, polydibutylsiloxane, polydiphenylsiloxane, poly(hydro)(methyl)siloxane, poly(hydro)(phenyl)siloxane, and poly(methyl)(phenyl)siloxane.

First Polysiloxane

The first polysiloxane, which may be an ultra-high molecular weight polysiloxane, may be characterized by a number average molecular weight greater than 100 kg/mole, or greater than 130 kg/mole, or greater than 150 kg/mole, or greater than 170 kg/mole, or greater than 200 kg/mole, or greater than 220 kg/mole, or greater than 250 kg/mole as determined by Gel Permeation Chromatography. The first polysiloxane may be characterized by a number average molecular weight of up to about 1,500 kg/mole, or up to about 1,000 kg/mole, or up to about 750 kg/mole, or up to about 500 kg/mole, In one or more embodiments, the first polysiloxane may be characterized by a number average molecular weight of from about 100 to about 1,000 kg/mole, or from about 150 to about 750 kg/mole, or from about 200 to about 500 kg/mole.

The first polysiloxane may also be characterized by an intrinsic viscosity, as determined per ASTM D1601 and D 4020, greater than 10,000, or greater than 25,000 dl/g, or greater than 50,000 dl/g, or greater than 100,000 dl/g, or greater than 150,000 dl/g, or greater than 200,000 dl/g. In one or more embodiments, the first polysiloxane may be characterized by an intrinsic viscosity, as determined per ASTM D1601 and D 4020, of up to 500,000 dl/g, or up to 250,000 dl/g, or up to 200,000 dl/g, or up to 100,000 dl/g. In some embodiments, the first polysiloxane may be characterized by an intrinsic viscosity of from 10,000 dl/g to 500,000 dl/g, or from 10,000 dl/g to 200,000 dl/g, or from 25,000 dl/g to 150,000 dl/g.

In one or more embodiments, the first polysiloxane can be defined by the formula I:

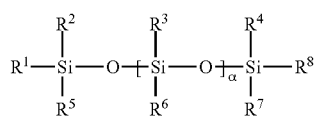

Formula I wherein $R^1$, $R^2$, $R^3$, $R^4$, $R^5$, $R^6$, $R^7$ and $R^8$ are each independently selected from the group consisting of alkyl, vinyl, chloroalkyl, fluororalkyl, aminoalkyl, epoxy, chloro, fluoro, or hydroxy groups, and a is 500 or greater. In particular embodiments, a is 1000 or greater, or a is 1000 to 20000, or a is 1000 to 15000.

In one or more embodiments, where $R^2$, $R^3$, $R^4$, $R^5$, $R^6$ and $R^7$ of formula I are methyl groups, the first polysiloxane is a polydimethylsiloxane of formula II,

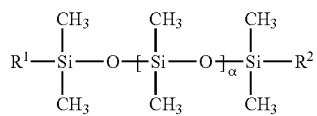

Formula II wherein $R^1$ and $R^2$ are independently alkyl, vinyl, chloroalkyl, aminoalkyl, epoxy, fluororalkyl, chloro, fluoro, or hydroxy groups, and α is 500 or greater. In particular embodiments, α is 1000 or greater, or α is 1000 to 20000, or α is 1000 to 15000.

In certain embodiments, wherein $R^2$, $R^3$, $R^4$, $R^5$, $R^6$ and $R^7$ of formula II are methyl groups and wherein $R^1$ and $R^8$ of formula II are vinyl groups, the first polysiloxane is a polydimethylsiloxane of formula III:

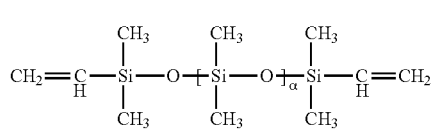

Formula III wherein α is 1350 or greater.

Ultra-high molecular weight polysiloxanes are available in many different forms, e.g., as pure compositions, as compounds, as concentrates, or as masterbatches. Examples of polymers into which the ultra-high molecular weight polysiloxanes can be compounded include polypropylene, polyethylene, polystyrene, polyamides, polyacetal, acrylonitrile-butadiene-styrene (ABS), polyester elastomer and copolyetherester elastomer. Typically, commercially available concentrates may contain the ultra-high molecular weight polysiloxane in a concentration ranging from 40 to 70 weight percent; however, any concentration is acceptable for purposes of the invention so long as the desired weight percent in the final product can be achieved.

In one or more embodiments, the first polysiloxane is added to the composition as a mixture of an ultra-high molecular weight polydialkylsiloxane and a polyolefin, such as polyethylene, polypropylene or a combination thereof. Some non-limiting examples of such polysiloxane mixtures include MB50 series Masterbatches (DOW CORNING®/ MULTIBASE) such as MB50-001, MB50-002, MB50-313, MB50-314 and MB50-321, DOW CORNING®/MULTIBASE).

Second Polysiloxane

The second polysiloxane may be characterized by a number average molecular weight less than 100 kg/mole, or less than 90 kg/mole, or less than 75 kg/mole, or less than 50 kg/mole, or less than 35 kg/mole, or less than 25 kg/mole as determined by Gel Permeation Chromatography. The second polysiloxane may be characterized by a number average molecular weight of at least 250 g/mole, or at least 500 g/mole, or at least 1 kg/mole, or at least 2.5 kg/mole, or at least 5 kg/mole, or at least 10 kg/mole, or at least 25 kg/mole. In one or more embodiments, the second polysiloxane may be characterized by a number average molecular weight of from about 1 to about 100 kg/mole, or from about 5 to about 85 kg/mole, or from about 10 to about 85 kg/mole, or from about 25 to about 75 kg/mole. In one or more preferred embodiments, the second polysiloxane is a liquid at standard conditions pressure and temperature.

The second polysiloxane may also be characterized by having an intrinsic viscosity, as determined per ASTM D1601 and D 4020, less than 10,000, or less than 5,000, or less than 2,500, or less than 2,000, or less than 1,500, or less than 1,000 dl/g. In some embodiments, the second polysiloxane may be characterized by an intrinsic viscosity of from 1,000 dl/g to 10,000 dl/g, or from 1,500 dl/g to 5,000 dl/g, or from 2,000 dl/g to 5,000 dl/g.

In one or more embodiments, the second polysiloxane includes from about 10 to 1500 repeating units of the formula:

$$R_nSiO_{(4-n)/2}$$

wherein each R group is the same or different and is independently selected from monovalent hydrocarbon groups having from 1 to about 18 carbon atoms, n is from 0 to 4. In certain embodiments, R is an alkyl or aryl group having from 1 to about 8 carbon atoms, e.g., methyl, ethyl, propyl, isobutyl, hexyl, phenyl or octyl; an alkenyl group such as vinyl; or halogenated alkyl groups such as 3,3,3-trifluoropropyl. In particular embodiments, at least 50% of all R groups are methyl groups, and in certain of these embodiments, substantially all R groups are methyl groups.

In certain embodiments, the second polysiloxane also contains R groups that are selected based on the cure mechanism desired for the composition containing the second polysiloxane. Typically, the cure mechanism is either by means of condensation cure or addition cure, but is generally via an addition cure process. For condensation reactions, two or more R groups per molecule should be hydroxyl or hydrolysable groups such as alkoxy group having up to 3 carbon atoms. For addition reactions two or more R groups per molecule may be unsaturated organic groups, typically alkenyl or alkynyl groups, preferably having up to 8 carbon atoms. When a composition containing the second polysiloxane is to be cured by an addition reaction, then it is preferred that R be alkenyl group e.g., vinyl, allyl, 1-propenyl, isopropenyl or hexenyl groups.

In one or more embodiments, the second polysiloxane includes one or more polymers defined by the formula $$R_2R^1SiO[(R_2SiO)_x(RR^1SiO)_y]SiR_2R^1$$

wherein each R is the same or different and is as previously described, preferably each R group is a methyl or ethyl group; $R^1$ is an alkenyl group, such as vinyl or hexenyl group; x is an integer and y is zero or an integer. In one embodiment, the second polysiloxane comprises two or more alkenyl groups.

Specific examples of the second polysiloxane include polymers of the formula

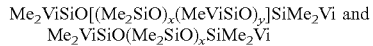
Me$_2$ViSiO[(Me$_2$SiO)$_x$(MeViSiO)$_y$]SiMe$_2$Vi and
Me$_2$ViSiO(Me$_2$SiO)$_x$SiMe$_2$Vi wherein Me represents the methyl group (—CH$_3$), and Vi represents the vinyl group (CH$_2$=CH—).

Slip Aids

In one or more embodiments, compositions of the invention may further include a slip aid. Slip aids may include any material that will enhance or lower the coefficient of friction of slip-coat layers (e.g., laminates) containing the compositions of the invention, and that preferably does not have a deleterious impact on the composition. Types of slip aids include fatty acids, fatty acid triglycerides, fatty acid amides, esters, fluoropolymers, graphite, molybdenum, silica, boron nitride, silicon carbide, and mixtures thereof.

Useful fatty acids include those obtained from both animal and plant sources, and include both saturated and unsaturated acids. Exemplary saturated fatty acids include butyric acid, lauric acid, palmitic acid, and stearic acid. Exemplary unsaturated fatty acids include oleic acid, linoleic acid, linolenic acid, and palymitoleic acid. Triglycerides of these fatty acids may also be employed.

Exemplary fatty acid amides include lauramide, palmitamide, stearamide and behenamide; unsaturated fatty acid amides such as erucamide, oleamide, brassidamide and elaidamide; and bisfatty acid amides such as methylenebisstearamide, methylenebisoleamide, ethylenebisstearamide and ethylenebisoleamide.

Useful esters include an ester of cetyl alcohol and acetic acid, an ester of cetyl alcohol and propionic acid, an ester of cetyl alcohol and butyric acid, an ester of beef tallow alcohol and acetic acid, an ester of beef tallow alcohol and propionic acid, an ester of beef tallow alcohol and butyric acid, an ester of stearyl alcohol and acetic acid, an ester of stearyl alcohol and propionic acid, an ester of stearyl alcohol and butyric acid, an ester of distearyl alcohol and phthalic acid, glycerol monooleate, glycerol monostearate, 12-hydroxylated stearates, glycerol tristearate, trimethylolpropane tristearate, pentaerythritol tetrastearate, butyl stearate, isobutyl stearate, stearic acid esters, oleic acid esters, behenic acid esters, calcium soap containing esters, isotridecyl stearate, cetyl palmitate, cetyl stearate, stearyl stearate, behenyl behenate, ethylene glycol montanate, glycerol montanate, pentaerythritol montanate and calcium containing montanic acid esters. Of these, an ester of distearyl alcohol and phthalic acid, glycerol monooleate, glycerol monostearate, stearic acid esters and glycerol montanate are preferred. Especially preferred, are an ester of distearyl alcohol and phthalic acid, glycerol monostearate and glycerol montanate.

Useful fluoropolymers include polytetrafluoroethylene and vinylidene fluoride copolymers. In one embodiment, the fluoropolymers are present in the form of finely dispersed particles deriving from fluoropolymer powders. The size of these particles or powders is from about 0.1 μm to about 15 μm, or from about 0.2 μm to about 5.0 μm.

Additional Additives

Fillers that may optionally be included include those reinforcing and non-reinforcing fillers or extenders that are conventionally employed in the compounding of polymeric materials. Useful fillers include carbon black, calcium carbonate, clays, silica, talc, and titanium dioxide.

Plasticizers, extender oils, synthetic processing oils, or a combination thereof may also be optionally added to the blend. The extender oils may include, but are not limited to, aromatic, naphthenic, and paraffinic extender oils. Exemplary synthetic processing oils are polylinear α-olefins, polybranched α-olefins, and hydrogenated polyalphaolefins. The compositions of this invention may include organic esters, alkyl ethers, or combinations thereof. U.S. Pat. Nos. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e., that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective. Synthetic polyalphaolefins are also useful in lowering $T_g$.

Oligomeric extenders may also optionally be used. Preferred oligomeric extenders include copolymers of isobutylene and butene or copolymers of butadiene together with a complementary comonomer. These oligomeric extenders typically have a number average molecular weight of less than 1,000. Useful oligomeric extenders are commercially available. For example, oligomeric copolymers of isobutylene and butene are available under the tradenames Polybutene™ (Soltex; Houston, Tex.), Indopol™ (BP; Great Britain), and Parapol™ (ExxonMobil). Oligomeric copolymers including butadiene are commercially available under the tradename Ricon Resin™ (Ricon Resins, Inc; Grand Junction, Colo.).

Polymeric processing additives may also optionally be added. These processing additives may include polymeric resins that have a very high melt flow index. These polymeric resins include both linear and branched molecules that have a melt flow rate that is greater than about 500 dg/min, or greater than about 750 dg/min, or greater than about 1000 dg/min, or greater than about 1200 dg/min, or greater than about 1500 dg/min. Mixtures of various branched or various linear polymeric processing additives, as well as mixtures of both linear and branched polymeric processing additives may be used. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

Stability-enhancing agents may optionally be included in the first layer. These agents include those commonly employed in the art such as antioxidants, UV stabilizers, antiozonants, and biostats.

Amounts

Rubber

The compositions may contain a rubber, such as a dynamically-vulcanized rubber. The composition can include at least about 5 wt %, or at least about 8 wt %, or at least about 10 wt %, or at least about 12 wt % of rubber, based upon the total weight of the composition. The amount of rubber within the composition can be, for example, from about 4 to about 20 wt %, or from about 5 to about 18 wt %, or from about 6 to about 15 wt %, based on the entire weight of the composition.

Plastic

The total amount of thermoplastic polymer (i.e., uncured polymer within the thermoplastic phase excluding any polysiloxane) within the compositions can be at least 35 wt %, or at least 40 wt %, or at least 45%, or at least 50 wt %, or at least 55 wt %. In these or other embodiments, the total amount of thermoplastic resin is less than 75 wt %, or less than 70 wt %, or less than 65 wt %. The total amount of thermoplastic polymer may be from about 30 to about 85 wt %, or from about 45 to about 75 wt %, or from about 50 to about 60 wt %, based on the entire weight of the composition.

In one or more embodiments, the compositions include at least 20 wt %, or at least 25 wt %, or at least 30%, or at least 33 wt %, or at least 35 wt % polypropylene. In these or other embodiments, the composition includes less than 55 wt %, or less than 45 wt %, or less than 40 wt % polypropylene. The total amount of polypropylene may be from about 20 to about 60 wt %, or from about 25 to about 55 wt %, or from about 30 to about 40 wt %, based on the entire weight of the composition.

In one or more embodiments, the compositions of the invention include both a low MFR polypropylene (i.e., an MFR of less than 3) and a high MFR polypropylene (i.e., an MFR greater than 3). The weight ratio of low MFR to high MFR polypropylene is from about 0.1:1 to 10:1, or from about 0.5:1 to 2:1, or from about 0.7:1 to 1.5:1, or from about 0.8:1 to 1.3:1, or from about 0.9:1 to 1.2:1

In one or more embodiments, the compositions of the invention include at least 20 wt %, or at least 15 wt %, or at least 18%, or at least 20 wt %, or at least 22 wt % polyethylene (e.g., high density polyethylene). In these or other embodiments, the composition includes less than 45 wt %, or less than 35 wt %, or less than 30 wt % polyethylene. The total amount of polyethylene may be from about 12 to about 50 wt %, or from about 15 to about 35 wt %, or from about 20 to about 30 wt %, based on the entire weight of the composition.

First Polysiloxane

The compositions may include greater than 5 wt %, or greater than 7 wt %, or greater than 9 wt % of the first polysiloxane, based upon the entire weight of the composition. In these or other embodiments, the composition includes less than 20 wt %, or less than 15 wt %, or less than 12 wt % of the first polysiloxane based upon the entire weight of the composition. The composition may include from about 5 or about 8 to about 20, or from about 7 or about 9 to about 15, or from about 10 to about 12 wt % of the first polysiloxane based upon the entire weight of the composition.

Second Polysiloxane

The compositions may include greater than 2 wt %, or greater than 3 wt %, or greater than 4 wt % the second polysiloxane based upon the entire weight of the composition. In these or other embodiments, the composition includes less than 12 wt %, or less than 10 wt %, or less than 8 wt %, or less than 7 wt % of the second polysiloxane, based upon the entire weight of the composition. The composition may include from about 2 to about 12, or from about 3 to about 10 wt % of the second polysiloxane, based upon the entire weight of the composition.

Slip Aids

The compositions may further include a slip aid (e.g., fatty acid amides). The composition may includes greater than 0.5 wt %, or greater than 1 wt %, or greater than 1.5 wt %, of the slip aid, based upon the entire weight of the composition. In these or other embodiments, the composition may include less than 5 wt %, or less than 3 wt %, or less than 2 wt % of slip aid, based upon the entire weight of the composition. The composition may include from about 0.5 to about 5, or from about 1 to about 3 wt % of slip aid, based upon the entire weight of the composition.

Filler

The compositions may further include a filler (e.g., carbon black and/or clay). The composition may include greater than 2 wt %, or greater than 3 wt %, or greater than 4 wt % of the filler based upon the entire weight of the composition. In these or other embodiments, the composition may include less than 10 wt %, or less than 8 wt %, or less than 6 wt % of filler based upon the entire weight of the composition. The composition may include from about 1 to about 10 wt %, or from about 2 to about 7 wt %, of filler based upon the entire weight of the composition.

Oil

The compositions may further include an oil (e.g., paraffinic oil). The composition may include greater than 2 wt %, or greater than 4 wt %, or greater than 6 wt %, of the oil based upon the entire weight of the composition. In these or other embodiments, the composition includes less than 15 wt %, or less than 12 wt %, or less than 10 wt % of oil, based upon the entire weight of the composition. The composition may include from about 2 to about 15, or from about 5 to about 12 wt %, of oil, based upon the entire weight of the composition.

Preparation

The compositions may be prepared by first forming a thermoplastic vulcanizate feed stock that includes the rubber, which is at least partially cured, dispersed within the thermoplastic resin. As discussed above, the thermoplastic vulcanizates may be formed by dynamic vulcanization. The first and second polysiloxanes, as well as the slip aids and other additives (e.g., an additional thermoplastic such as polyethylene), may be subsequently added to the thermoplastic vulcanizate to form the composition. In one or more embodiments, the polysiloxane resins are added while the thermoplastic vulcanizate is in its molten state; that is, the thermoplastic vulcanizate is at a temperature sufficient to achieve flow of the thermoplastic resin phase.

The first and second polysiloxanes (as well as any other additional additives) may be introduced to the thermoplastic vulcanizate during manufacture of the thermoplastic vulcanizate but following sufficient cure of the rubber, which achieves phase inversion of the rubber within the blend. Dynamic vulcanization may begin by including a greater volume fraction of rubber than thermoplastic resin. As such, the thermoplastic resin is present as the discontinuous phase. As dynamic vulcanization proceeds, the viscosity of the rubber increases and phase inversion occurs. In other words, the thermoplastic resin phase becomes continuous and the rubber becomes a discontinuous phase. In other embodiments, a co-continuous morphology or pseudo co-continuous morphology can be achieved where both the rubber and the thermoplastic resin are continuous phases. In one or more embodiments, the thermoplastic (e.g., polypropylene or polyethylene) resins are added after about 50%, or after 75%, or after about 90%, of the curative is consumed. In certain embodiments, the polysiloxanes are added after the curative is completely consumed or full cure has been achieved. In certain embodiments, the thermoplastic vulcanizate is maintained in its molten state from the time of dynamic vulcanization until the polysiloxanes are added.

In other embodiments, the polysiloxanes (as well as any other additional additives) may be introduced to the thermoplastic vulcanizate after the thermoplastic vulcanizate has been cooled and optionally fabricated (e.g., pelletized) and re-melted. For example, pellets of thermoplastic vulcanizate can be melted and melt blended with the polysiloxanes. In certain embodiments, the thermoplastic vulcanizate is first melted, and then the polysiloxanes (as well as any other additional additives) are subsequently introduced. In other embodiments, pellets of the thermoplastic vulcanizate and one or more of the polysiloxanes are blended (i.e., introduced), and then the mixture is melted and blended.

The addition of the first and second polysiloxanes can occur by using a variety of techniques. For example, each polysiloxane may be sequentially added to the thermoplastic vulcanizate. In other words, the first polysiloxane may be added, followed by the second polysiloxane. Alternatively, the second polysiloxane is added, followed by the first polysiloxane. The order of addition may vary with respect to the other ingredients as well.

In some embodiments, the first and second polysiloxanes may be pre-blended prior to combining them with the thermoplastic vulcanizate. For example, the first and second polysiloxanes may be melt blended and subsequently added to the thermoplastic vulcanizate. This subsequent addition after melt blending can occur in the liquid (molten) or solid state.

INDUSTRIAL APPLICABILITY

The compositions of the present invention are useful as slip-coat compositions, and can be used to form laminates that are useful where sliding force over long numbers of cycles is desired. In one or more embodiments, these characteristics can be achieved in wet conditions and/or over a broad temperature span. The laminate may form at least a portion of a weatherseal such as, but not limited to, a window channel (a.k.a. glass run channel) that mates with a movable window of an automobile.

Laminates of the present invention include at least two layers, which may be referred to as first and second polymer layers. The first polymer layer, which may also be referred to as the surface layer or slip layer or slip coat layer, may be prepared from the compositions described herein. The second layer, which may also be referred to as the substrate or base layer, includes at least one polymer characterized by having a glass transition temperature ($T_g$) that is lower than ambient temperature, such as less than 0° C., or less than −20° C., or less than about −65° C. In one or more embodiments, the substrate includes at least one rubbery polymer. In certain embodiments, the substrate may include one or more block copolymers that include a soft or rubbery segment (i.e., a segment having a glass transition temperature that is less than about 0° C.). In other embodiments, these compositions may include blends of rubbery polymers together with thermoplastic polymers.

Useful rubbery polymers include natural or synthetic rubbery polymers. Synthetic rubbery polymers include homopolymers of one or more conjugated dienes and copolymers of conjugated dienes and vinyl aromatics such as styrene. Other useful rubbery copolymers include copolymers of ethylene, propylene, and diene monomers. The copolymers include both random copolymers (e.g., styrene-butadiene rubber) as well as block copolymer (e.g., styrene-butadiene-styrene block copolymers (S-B-S) and the hydrogenated derivatives thereof (S-E/B-S)). In another embodiment, the substrate includes a blend of a poly α-olefin (e.g., polypropylene) and a block copolymer (e.g., S-B-S or S-E/B-S); in particular embodiments, these may include blends of polyolefin with crosslinkable/crosslinked styrenic block copolymers.

In particular embodiments, the substrate includes a thermoplastic vulcanizate, which as described herein generally include blends of cured (either fully or partially) rubber and thermoplastic resins. In one or more embodiments, the thermoplastic vulcanizate includes cured copolymers of ethylene, propylene, and diene monomers (e.g., EPDM) dispersed within a continuous poly α-olefin (e.g., polypropylene) phase.

The substrate may include a thermoplastic vulcanizate characterized by a Shore A hardness greater than 45, or greater than 50, or greater than 55, or greater than 60. In these or other embodiments, the substrate is a thermoplastic vulcanizate characterized by a Shore A hardness less than 70, or less than 65, or less than 60, or less than 55, or less than 50.

Laminates can be prepared by employing a variety of techniques. For example, the slip-coat compositions described herein and the substrate may be co-extruded to form an integral laminate. In other embodiments, the substrate layer is first prepared by using a variety of techniques including molding or extruding, and then the slip-coat composition is subsequently extruded onto the substrate. In other embodiments, the slip-coat composition and substrate can be separately extruded and then laminated to one another.

Although the invention is not particularly limited to any particular thicknesses of the first and second layers, the thickness of the slip-coat layer (containing the compositions described herein) may be from about 50 μm to about 150 μm, or from about 75 μm to about 125 μm, or from about 85 μm to about 115 μm. The thickness of the substrate layer can vary depending on the construction of the laminate or the glass run channel.

Exemplary Characteristics of Slip Coat Layers

Slip-coat layers containing the compositions described herein can be characterized by having numerous advantageous properties including a relatively low coefficient of friction, improved surface appearance, improved wear resistance, improved UV stability, and less susceptibility to stress whitening.

The slip-coat layer may be characterized by exhibiting a kinetic coefficient of friction, per ASTM D1894-99 on glass at room temperature, of less than 0.20, or less than 0.19, or less than 0.18.

Likewise, certain embodiments of the slip-coat layer may be characterized by exhibiting a static coefficient of friction per ASTM D1894-99 on glass at room temperature, of less than 0.20, or less than 0.19, or less than 0.18.

Still further, certain embodiments of the slip-coat layer can be characterized by exhibiting a Shore D hardness of from about 30 to about 55, or from about 35 to about 50, or from about 40 to about 45.

Also, certain embodiments of the slip-coat layer are characterized by exhibiting an improved surface appearance as demonstrated by relatively low extrusion surface ratings (ESR). ESR can be analyzed as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994). Preferably, the slip-coats are characterized by having an ESR value (Ra) that is less than 120, or less than 80, or less than 50.

SPECIFIC EMBODIMENTS

Exemplary embodiments of the invention are provided below.

Embodiment A

A composition, useful as a slip-coat composition, comprising: (i) a dispersed phase of rubber that is at least partially cured; (ii) a continuous thermoplastic phase including at least one thermoplastic polymer; (iii) a first polysiloxane having a number average molecular weight greater than 100 kg/mole; and (iv) a second polysiloxane having a number average molecular weight less than 100 kg/mole.

Embodiment B

The composition of Embodiment A, wherein the first polysiloxane has a molecular weight greater than 130 kg/mole.

Embodiment C

The composition of Embodiments A and B, wherein the second polysiloxane is a liquid polysiloxane.

Embodiment D

The composition of Embodiments A-C, wherein the composition comprises from about 4 to about 20 wt % of the rubber, based on the weight of the composition.

Embodiment E

The composition of Embodiments A-D, wherein the composition comprises from about 3 to about 85 wt % of the thermoplastic polymer, based on the weight of the composition.

Embodiment F

The composition of Embodiments A-E, wherein the composition comprises from about 8 to about 20 wt % of the first polysiloxane, based on the weight of the composition.

Embodiment G

The composition of Embodiments A-F, wherein the composition comprises from about 2 to about 12 wt % of the second polysiloxane, based on the weight of the composition.

Embodiment H

The composition of Embodiments A-G, further comprising a slip aid.

Embodiment I

The composition of Embodiments A-H, wherein the slip aid is a fatty acid amide.

Embodiment J

The composition of Embodiments A-I, wherein the composition comprises from about 0.5 to about 5 wt % of the slip aid, based on the weight of the composition.

Embodiment K

The composition of Embodiments A-J, wherein the thermoplastic polymer comprises at least one of polypropylene and polyethylene.

Embodiment L

The composition of Embodiment K, where the polypropylene is crystalline polypropylene and the polyethylene is high density polyethylene, based on the weight of the composition.

Embodiment M

The composition of Embodiments K or L, wherein the composition comprises from 20 to 60 wt % polypropylene and from 12 to 50 wt % polyethylene, based on the weight of the composition.

Embodiment N

A laminate comprising: (a) a first layer including a composition comprising: (i) a dispersed phase of rubber that is at least partially cured; (ii) a continuous thermoplastic phase including at least one thermoplastic polymer; (iii) a first polysiloxane having a number average molecular weight greater than 100 kg/mole; and (iv) a second polysiloxane having a number average molecular weight less than 100 kg/mole; and (b) a second layer including a polymer.

Embodiment O

The laminate of Embodiment N, wherein the second layer comprises a thermoplastic vulcanizate.

Embodiment P

The laminate of Embodiments N-O, wherein the composition in the first layer comprises from about 4 to about 20 wt % of the rubber, from about 3 to about 85 wt % of the thermoplastic polymer, from about 8 to about 20 wt % of the first polysiloxane, from about 2 to about 12 wt % of the second polysiloxane, and from about 0.5 to about 5 wt % of a slip aid, based on the weight of the composition.

Embodiment Q

The laminate of Embodiments N-P, wherein the composition in the first layer comprises from 20 to 60 wt % polypropylene and from 12 to 50 wt % polyethylene.

Embodiment R

A method for making a composition, comprising the steps of:
(a) combining (i) a thermoplastic vulcanizate comprising a dispersed phase of rubber that is at least partially cured, and a continuous thermoplastic phase including at least one thermoplastic polymer, with (ii) a first polysiloxane having a number average molecular weight greater than 100 kg/mole; and (iii) a second polysiloxane having a number average molecular weight less than 100 kg/mole, and (b) forming the composition.

Embodiment S

A method for making a laminate, comprising the steps of: (a) forming a first layer including a composition comprising: (i) a dispersed phase of rubber that is at least partially cured; (ii) a continuous thermoplastic phase including at least one thermoplastic polymer; (iii) a first polysiloxane having a number average molecular weight greater than 100 kg/mole; and (iv) a second polysiloxane having a number average molecular weight less than 100 kg/mole; (b) forming a second layer including a polymer; and (c) forming a laminate including the first layer and the second layer.

Embodiment T

The composition or laminate of any of the foregoing embodiments, wherein the first polysiloxane has an intrinsic viscosity, as determined per ASTM D1601 and D 4020, of greater than 10,000 dl/g, and/or the second polysiloxane has an intrinsic viscosity, as determined per ASTM D1601 and D 4020, of less than 10,000 dl/g.

Embodiment U

A weatherseal comprising the composition and/or laminate of any of the foregoing Embodiments.

EXAMPLES

In order to demonstrate the practice of the present invention, the following examples have been prepared and tested. The examples should not, however, be viewed as limiting the scope of the invention.
Samples 1-3
In a first experiment, three compositions were prepared and tested for sliding performance pursuant to standardized tests. In particular, the compositions were prepared by melt blending one or more of a commercially available thermoplastic vulcanizate, two additional polypropylenes, a polyethylene, first and second polysiloxanes, and a slip aid. The specific recipe for each sample is provided in Table I.

TABLE I

| | Sample | | |
|---|---|---|---|
| | 1 | 2 | 3 |
| Ingredients (Weight %) | | | |
| Thermoplastic Vulcanizate | 49.0 | 44.0 | 44.0 |
| High MFR PP | 15.2 | 15.2 | — |
| Low MFR PP | — | — | 15.2 |
| HDPE | 22.8 | 22.8 | 22.8 |
| First Polysiloxane | 10.0 | 10.0 | 10.0 |
| Slip Aid | 3.0 | 3.0 | 3.0 |
| Second Polysiloxane | — | 5.0 | 5.0 |
| Sliding Force (Newtons) | | | |
| Initial | 4.27 | 3.86 | 4.32 |
| 1,000 cycles | 7.47 | 5.55 | 6.54 |
| 5,000 cycles | 10.66 | 10.33 | 10.00 |

The thermoplastic vulcanizate was obtained under the tradename Santoprene 121-87 (ExxonMobil), and was characterized by a Shore A hardness of 87; the high MFR PP was obtained under the tradename F180A (Braskem), and was characterized by an MFR of 20 g/10 min at 230 C at 2.16 kg load; the low MFR PP was obtained under the tradename PP5341 (ExxonMobil), and was characterized by an MFR of 0.8 g/10 at 230 C at 2.16 kg load; the HDPE was obtained under the tradename HDPE7960.13 (ExxonMobil), and was characterized by a melt index of 0.06; the slip aid was a fatty acid amide obtained under the tradename Kemamide E (PMC Group); the first polysiloxane was obtained under the tradename SiMB 50-314 (Dow Corning), and was characterized as an ultra-high molecular weight polysiloxane (e.g., may be characterized as having a number average molecular weight greater than 100 kg/mole); and the second polysiloxane was obtained under the tradename PMX-200 Xiameter (Dow Corning), and was a liquid that was characterized by a viscosity of 1,000 cSt, and may be characterized as having a number average molecular weight less than 100 kg/mole.

The compositions were prepared with a twin-screw extruder. Mixing took place at a temperature above the melt temperature of the polypropylene. Each of the ingredients were added to the feed throat of the extruder, and the mixed product was pelletized upon extrusion.

Test samples were prepared by forming a laminate with a thermoplastic vulcanizate. The laminate was about 2 mm thick, with each layer (i.e., the slip coat layer and the thermoplastic vulcanizate substrate) each being about 1 mm thick. The thermoplastic vulcanizate substrate was obtained under the tradename Santoprene 121-67W175 or 121-73W175. The laminates were either formed by coextrusion or by laminating sheets of each of the materials.

Testing generally took place by sliding a glass test block across the slip coat layer at a stroke distance of 100 mm and a speed of 6000 mm/min. The force required to slide the test block across the slip coat layer was recorded for each cycle. The glass test block had a weight of 5 kg and included a rounded surface having a radius of 5 cm. The results of the testing are provided in Table I.

The data in Table I shows that the addition of the second polysiloxane improves the sliding characteristics of the slip coat.
Samples 4-7
In a second experiment, four compositions were prepared and tested for sliding performance pursuant to standardized tests. In particular, the compositions were prepared by melt blending one or more of a commercially available thermoplastic vulcanizate, an additional polypropylene, a polyethylene, first and second polysiloxanes, and a slip aid. The specific recipe for each sample is provided in Table II.

TABLE II

| | Sample | | | |
|---|---|---|---|---|
| | 4 | 5 | 6 | 7 |
| Ingredients (Weight %) | | | | |
| Thermoplastic Vulcanizate | 52.0 | 50.5 | 52.0 | 50.5 |
| High MFR PP | 32.4 | 31.4 | 16.2 | 15.7 |
| HDPE | — | — | 16.2 | 15.7 |
| First Polysiloxane | 10.8 | 10.5 | 10.8 | 10.5 |
| Slip Aid | — | 2.9 | — | 2.9 |
| Second Polysiloxane | 4.9 | 4.8 | 4.9 | 4.8 |

TABLE II-continued

| | Sample | | | |
|---|---|---|---|---|
| | 4 | 5 | 6 | 7 |
| Sliding Force (Newtons) | | | | |
| Initial | 2.73 | 2.83 | 2.53 | 2.36 |
| 100 cycles | 4.72 | 3.84 | 3.43 | 3.63 |
| 500 cycles | 7.06 | 4.76 | 4.88 | 3.82 |
| 1,000 cycles | 7.82 | 5.11 | 5.88 | 4.23 |

The ingredients employed were the same as those employed in Samples 1-3 except that the low MFR PP was not employed, and the second polysiloxane was instead obtained under the tradename PMX-200 Xiameter (Dow Corning), and was a liquid that was characterized by a viscosity of 350 cSt, and may be characterized as having a number average molecular weight less than 100 kg/mole.

The compositions were prepared with a laboratory Haake mixer. The test samples were prepared using the procedure set forth in Samples 1-3, and the same testing was conducted.

The data in Table II shows that a synergistic relationship may exist between the second polysiloxane and the high density polyethyelene.

Samples 8-15

In a third experiment, eight compositions were prepared and tested for sliding performance pursuant to standardized tests. In particular, the compositions were prepared by melt blending commercially available thermoplastic vulcanizate with an additional polypropylene, a polyethylene, first and second polysiloxanes, and a slip aid. The specific recipe for each sample is provided in Table III.

TABLE III

| | Sample | | | | | | | |
|---|---|---|---|---|---|---|---|---|
| | 8 | 9 | 10 | 11 | 12 | 13 | 14 | 15 |
| Ingredients (weight %) | | | | | | | | |
| Thermoplastic Vulcanizate I | 44.0 | 46.0 | — | — | — | — | — | — |
| Thermoplastic Vulcanizate II | — | — | 44.0 | 45.0 | 46.0 | — | 48.0 | 49.0 |
| Thermoplastic Vulcanizate III | — | — | — | — | — | 46.0 | — | — |
| High MFR PP | 15.2 | 15.2 | 15.2 | 15.2 | 15.2 | 15.2 | 15.2 | 15.2 |
| HDPE | 22.8 | 22.8 | 22.8 | 22.8 | 22.8 | 22.8 | 22.8 | 22.8 |
| First Polysiloxane | 10.0 | 10.0 | 10.0 | 10.0 | 10.0 | 10.0 | 10.0 | 10.0 |
| Slip Aid | 3.0 | 1.0 | 3.0 | 2.0 | 1.0 | 1.0 | 2.0 | 1.0 |
| Second Polysiloxane | 5.0 | 5.0 | 5.0 | 5.0 | 5.0 | 5.0 | 2.0 | 2.0 |
| Sliding Force (Newtons) | | | | | | | | |
| average, 0-5,000 cycles | 1.87 | 1.81 | 1.91 | 1.48 | 1.53 | 1.74 | 2.38 | 2.37 |
| average, 5,000-10,000 cycles | 1.81 | 1.79 | 1.74 | 1.56 | 1.51 | 1.59 | 2.09 | 3.09 |
| average, 10,000-15,000 cycles | 1.76 | 1.84 | 1.73 | 1.59 | 1.51 | 1.67 | 2.11 | 4.74 |
| average, 15,000-20,000 cycles | 1.68 | 1.89 | 1.69 | 1.60 | 1.49 | 1.62 | 2.05 | 5.66 |

The ingredients employed were the same as those employed in Samples 1-3 except that the low MFR PP was not employed and the different commercially available thermoplastic vulcanizates were employed in certain samples. Thermoplastic vulcanizate I was obtained under the tradename 121-87, and was characterized by a Shore A hardness of 87; Thermoplastic vulcanizate II was obtained under the tradename 123-40 (ExxonMobil), and characterized by a Shore A hardness of 40; Thermoplastic vulcanizate III was obtained under the tradename 123-50 (ExxonMobil) and was characterized by a Shore A hardness of 50. As in Samples 1-3, the second polysiloxane was obtained under the tradename PMX-200 Xiameter (Dow Corning), and was a liquid that was characterized by a viscosity of 100 cSt, and may be characterized as having a number average molecular weight less than 100 kg/mole.

The compositions were prepared with a twin-screw extruder. The test samples were prepared using the procedure set forth in Samples 1-3, and the same testing was conducted.

The data in Table III shows that the overall hardness of the composition may impact overall performance of the slip coat.

Various modifications and alterations that do not depart from the scope and spirit of this invention will become apparent to those skilled in the art. This invention is not to be duly limited to the illustrative embodiments set forth herein.

What is claimed is:

1. A composition consisting of:
   (i) a dispersed phase of olefinic elastomeric copolymer rubber that is at least partially cured;
   (ii) a continuous thermoplastic phase including at least one thermoplastic polymer, wherein the thermoplastic polymer comprises a polypropylene having a melt flow rate, as determine at 230° C., 2.16 kg, of greater than 3 g/10 min;
   (iii) a first polysiloxane having a number average molecular weight greater than 100 kg/mole;
   (iv) a second polysiloxane having a number average molecular weight less than 100 kg/mole;
   (v) optionally, one or more slip aids;
   (vi) optionally, one or more fillers;
   (vii) optionally, one or more extender oils, synthetic processing oils or combinations thereof;
   (viii) optionally one or more polymeric processing additives;
   (ix) optionally, one or more stability-enhancing agents selected from the group consisting of antioxidants, UV stabilizers, antiozonants, biostats, and combinations thereof.

2. The composition of claim 1, wherein the first polysiloxane has a molecular weight greater than 130 kg/mole.

3. The composition of claim 1, wherein the second polysiloxane is a liquid polysiloxane.

4. The composition of claim 1, wherein the first polysiloxane has an intrinsic viscosity, as determined per ASTM D1601 and D 4020, of greater than 10,000 dl/g.

5. The composition of claim 1, wherein the second polysiloxane has an intrinsic viscosity, as determined per ASTM D1601 and D 4020, of less than 10,000 dl/g.

6. The composition of claim 1, wherein the second polysiloxane has a viscosity of about 1,000 cSt or less.

7. The composition of claim 1, wherein the composition comprises from about 8 to about 20 wt % of the first polysiloxane, based on the weight of the composition.

8. The composition of claim 1, wherein the composition comprises from about 2 to about 12 wt % of the second polysiloxane, based on the weight of the composition.

9. The composition of claim 1, wherein the composition comprises from about 4 to about 20 wt % of the rubber, based on the weight of the composition.

10. The composition of claim 1, wherein the composition comprises from about 3 to about 85 wt % of the thermoplastic polymer, based on the weight of the composition.

11. The composition of claim 1, wherein the one or more slip aids comprises a fatty acid amide.

12. The composition of claim 1, wherein the composition comprises from about 0.5 to about 5 wt % of the slip aid, based on the weight of the composition.

13. The composition of claim 1, wherein the polypropylene is crystalline polypropylene.

14. The composition of claim 1, wherein the composition comprises from 20 to 60 wt % polypropylene, based on the weight of the composition.

* * * * *